US012785063B2

(12) United States Patent
Hosono et al.

(10) Patent No.: US 12,785,063 B2
(45) **Date of Patent: *Nov. 3, 2026**

(54) ELECTRODE ACTIVE MATERIAL LAYER MANUFACTURING DEVICE, AND ELECTRODE ACTIVE MATERIAL LAYER MANUFACTURING METHOD EMPLOYING SAME

(71) Applicant: ZEON CORPORATION, Tokyo (JP)

(72) Inventors: Yuto Hosono, Tokyo (JP); Takahiro Ogawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 329 days.

This patent is subject to a terminal disclaimer.

(21) Appl. No.: 18/712,382

(22) PCT Filed: Nov. 21, 2022

(86) PCT No.: PCT/JP2022/043021

§ 371 (c)(1),
(2) Date: May 22, 2024

(87) PCT Pub. No.: WO2023/100709

PCT Pub. Date: Jun. 8, 2023

(65) Prior Publication Data

US 2025/0015249 A1 Jan. 9, 2025

(30) Foreign Application Priority Data

Dec. 3, 2021 (JP) ................................ 2021-197314

(51) Int. Cl.
*H01M 4/04* (2006.01)
*B05C 5/00* (2006.01)
(Continued)

(52) U.S. Cl.
CPC ........... *H01M 4/0435* (2013.01); *B05C 5/007* (2013.01); *H01M 4/04* (2013.01); *H01M 4/0404* (2013.01); *H01M 4/139* (2013.01)

(58) Field of Classification Search
CPC .. H01M 4/0435; H01M 4/0404; B05C 1/0813
See application file for complete search history.

(56) References Cited

U.S. PATENT DOCUMENTS 10,084,179 B2 * 9/2018 Tanihara .................. B05C 9/04
10,396,350 B2 * 8/2019 Hosono .............. H01M 4/0469
(Continued)

FOREIGN PATENT DOCUMENTS

JP H03161314 A 7/1991
JP H09245776 A 9/1997
(Continued)

OTHER PUBLICATIONS

Jan. 31, 2023, International Search Report issued in the International Patent Application No. PCT/JP2022/043021.
(Continued)

*Primary Examiner* — Atul P. Khare
(74) *Attorney, Agent, or Firm* — KENJA IP LAW PC

(57) ABSTRACT

A production apparatus of an electrode active material layer comprises: a feeding unit feeding granulated particles; a conveying unit conveying the particles; a support unit supporting the particles; a squeegee unit spaced above the support unit and leveling the particles to form a granulated particle layer; a rolling unit rolling the granulated particle layer to form an electrode active material layer; and a pair of stock guide units each having a plate shape. The stock guide units are respectively disposed to be parallel to the squeegee unit. An upstream end of the stock guide unit is located upstream of a position of a gap between the support unit and the squeegee unit. A downstream end of the stock
(Continued)

guide unit is located downstream of the position of the gap. A distance between side surfaces of the stock guide units is equivalent to the electrode active material layer's width.

9 Claims, 7 Drawing Sheets

(51) Int. Cl.

| | |
|---|---|
| ***H01M 4/139*** | (2010.01) |
| *H01M 4/02* | (2006.01) |

(56) References Cited

U.S. PATENT DOCUMENTS

| | | | |
|---|---|---|---|
| 2017/0179465 A1 | 6/2017 | Torita et al. | |
| 2017/0256781 A1 | 9/2017 | Suzuki et al. | |
| 2025/0018419 A1 | 1/2025 | Fujii | |
| 2025/0023010 A1 | 1/2025 | Fujii | |

FOREIGN PATENT DOCUMENTS

| | | | | |
|---|---|---|---|---|
| JP | 2005139536 A | | 6/2005 |
| JP | 56655532 B2 | | 2/2015 |
| JP | 2016018682 A | | 2/2016 |
| JP | 2016025060 A | | 2/2016 |
| JP | 2016062654 A | | 4/2016 |
| JP | 2016100067 A | | 5/2016 |
| JP | 2016100161 A | * | 5/2016 |
| JP | 2016115432 A | | 6/2016 |
| JP | 2016115569 A | | 6/2016 |
| JP | 2019029308 A | | 2/2019 |
| JP | 2019075244 A | | 5/2019 |
| WO | 2023100971 A1 | | 6/2023 |
| WO | 2023100973 A1 | | 6/2023 |

OTHER PUBLICATIONS

Dec. 22, 2025, the Extended European Search Report issued by the European Patent Office in the corresponding European Patent Application No. 22901142.4.

May 2, 2024, International Preliminary Report on Patentability issued in the International Patent Application No. PCT/JP2022/043021.

Apr. 29, 2025, International Preliminary Report on Patentability issued in the International Patent Application No. PCT/JP2023/037857.

Feb. 14, 2023, International Search Report issued in the International Patent Application No. PCT/JP2022/044348.

Jan. 23, 2024, International Search Report, issued in the International Patent Application No. PCT/JP2023/037857.

May 2, 2024, International Preliminary Report on Patentability issued in the International Patent Application No. PCT/JP2022/044348.

Oct. 31, 2025, the Extended European Search Report issued by the European Patent Office in the corresponding European Patent Application No. 22901403.0.

* cited by examiner

ELECTRODE ACTIVE MATERIAL LAYER MANUFACTURING DEVICE, AND ELECTRODE ACTIVE MATERIAL LAYER MANUFACTURING METHOD EMPLOYING SAME

TECHNICAL FIELD

The present invention relates to a production apparatus of an electrode active material layer and a production method of an electrode active material layer using the same.

BACKGROUND ART

Among techniques for producing an electrode active material layer used in a battery such as a lithium ion battery, for example, there is a known technique that consists of conveying a substrate, feeding granulated particles containing an electrode active material and a binder on the conveyed substrate, leveling the granulated particles with a roll-shaped squeegee unit, and then rolling the granulated particles with rolling rolls (Patent Literature 1).

CITATION LIST

Patent Literature

Patent Literature 1: Japanese Patent Application Laid-Open No. 2016-115569 A

SUMMARY OF THE INVENTION

Technical Problem

As described above, in a case where a step of leveling the granulated particles with the squeegee unit is included in a production method of an electrode active material layer, the granulated particles may possibly flow to the outer side beyond a desired forming width of the electrode active material layer, and the smoothness at the end portions of the electrode active material layer obtained (smoothness at the end portions) may be insufficient. In addition, improvement in the yield of the granulated particles is desired.

The present invention has been made in consideration of the aforementioned problems, and an object of the present invention is to provide a production apparatus of an electrode active material layer that can produce an electrode active material layer in which the yield of granulated particles is favorable and in which the smoothness at the end portions is sufficient, and a production method of an electrode active material layer using the same.

Solution to Problem

The present inventors have conducted studies to solve the aforementioned problems. As a result, the present inventors have conceived that the problems can be solved by disposing plate-like stock guide units each having a specific shape on both side-surface sides of a squeegee unit, thereby completing the present invention.

That is, the present invention includes the following.

<1> A production apparatus of an electrode active material layer, comprising:

- a feeding unit that feeds granulated particles containing an electrode active material and a binder;
- a conveying unit that conveys the granulated particles that have been fed from the feeding unit;

- a support unit that supports the granulated particles that have been conveyed by the conveying unit;
- a squeegee unit that is disposed to be spaced above the support unit and that levels the granulated particles to form a granulated particle layer; and
- a rolling unit that rolls the granulated particle layer to form an electrode active material layer, wherein:
- the production apparatus of an electrode active material layer comprises a pair of stock guide units each having a plate shape;
- the paired stock guide units each independently are disposed to be parallel to side surfaces of the squeegee unit;
- the paired stock guide units are disposed so that an upstream end portion of the stock guide unit is located upstream of a position of a gap portion between the support unit and the squeegee unit, so that a downstream end portion of the stock guide unit is located downstream of the position of the gap portion, and so that a distance between side surfaces of the paired stock guide units is equivalent to a width of the electrode active material layer.

<2> The production apparatus of an electrode active material layer according to <1>, wherein:

the support unit has a roll shape; the paired stock guide units are disposed on the support unit; the paired stock guide units each independently have a surface which is located on a side closer to the support unit and is a curved surface; and a ratio (R1/R0) of a radius of curvature R1 of the curved surface of the stock guide unit relative to a radius of curvature R0 of a curved surface of the roll of the support unit is 0.95 or more and 1.10 or less.

<3> The production apparatus of an electrode active material layer according to <1> or <2>, wherein: the conveying unit is provided on the support unit; the conveying unit and the stock guide unit are in contact with each other; and a ratio of a contact length of the stock guide unit to a circumference length of the support unit is 7.5% or more and 17.5% or less.

<4> The production apparatus of an electrode active material layer according to <1> or <2>, wherein: the conveying unit is provided on the support unit; a gap is formed between the conveying unit and the stock guide unit; and a size of the gap is 70% or less of an average particle diameter (D50) of the granulated particles.

<5> The production apparatus of an electrode active material layer according to any one of <1> to <4>, wherein the paired stock guide units each independently have a friction coefficient of 0.50 or less.

<6> A production method of an electrode active material layer using the production apparatus of an electrode active material layer according to any one of <1> to <5>, the production method comprising:

- a step (A) of feeding the granulated particles from the feeding unit;
- a step (B) of conveying the granulated particles that have been fed;
- a step (C) of disposing on the support unit the conveyed granulated particles and leveling the granulated particles using the squeegee unit to form the granulated particle layer between the side surfaces of the pair of stock guide units; and
- a step (D) of rolling the granulated particle layer using the rolling unit to form the electrode active material layer.

<7> The production method of an electrode active material layer according to <6>, further comprising a step of feeding a substrate before the step (A), the steps (A) to (D) being performed on the substrate.

<8> The production method of an electrode active material layer according to <7>, further comprising:

applying a binder coating liquid containing a binder onto a surface of the substrate before the step (A); and feeding the granulated particles on the surface of the substrate to which the binder coating liquid has been applied, in the step (A).

<9> The production method of an electrode active material layer according to <6>, further comprising a step of feeding a substrate after the step (C), wherein the step (D) includes rolling the granulated particle layer, which has been formed on the support unit, between the fed substrate and the support unit using the rolling unit to transfer the electrode active material layer onto the substrate.

Advantageous Effects of Invention

According to the present invention, it is possible to provide a production apparatus of an electrode active material layer that can produce an electrode active material layer in which the yield of granulated particles is favorable and in which the smoothness at the end portions is sufficient, and a production method of an electrode active material layer using the same.

DESCRIPTION OF EMBODIMENTS

Figure 1:
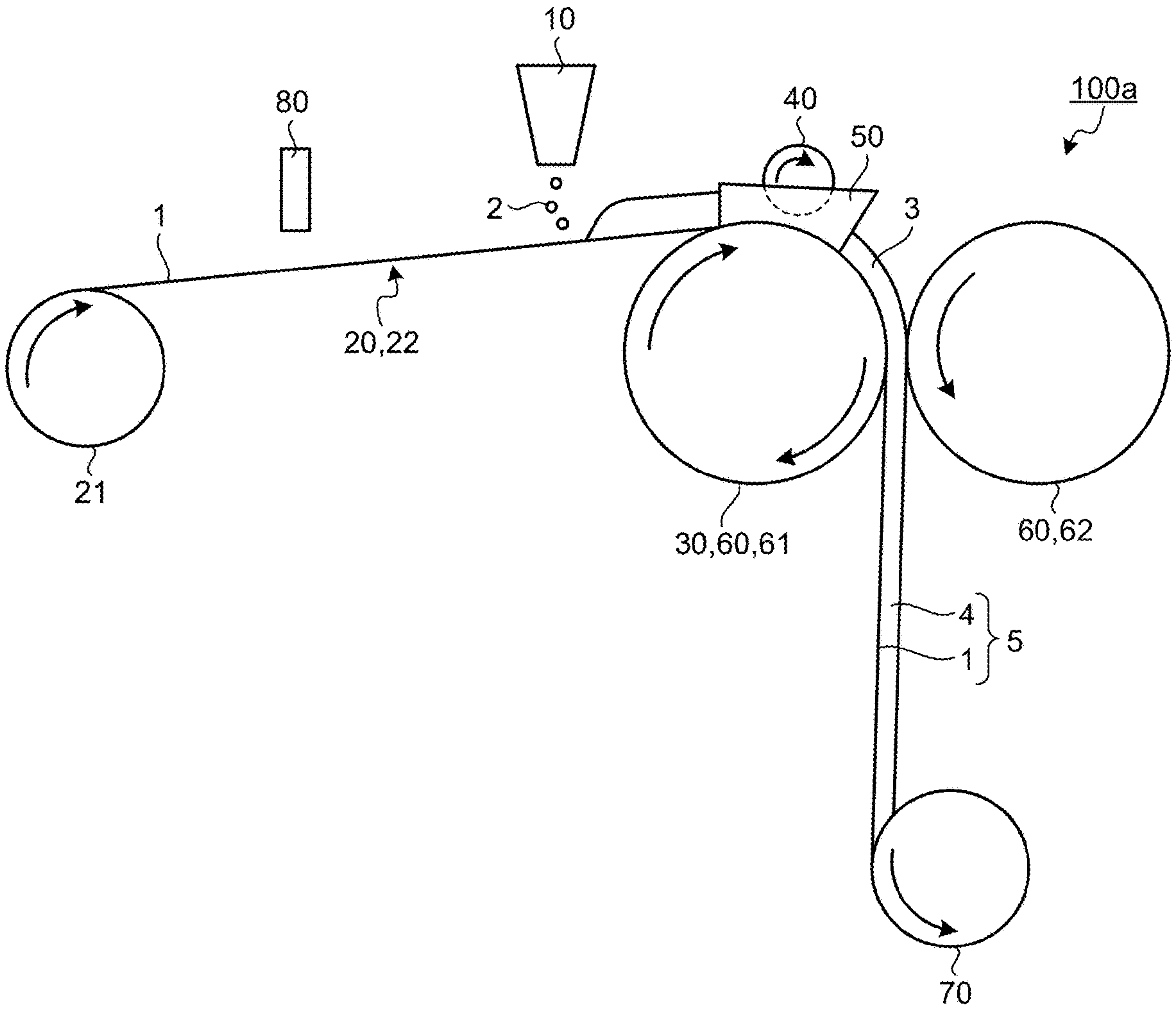
FIG. 1 is a side view schematically illustrating a production apparatus of an electrode active material layer according to a first embodiment of the present invention.

Hereinafter, the present invention will be described in detail with reference to embodiments and examples. However, the present invention is not limited to embodiments and examples described below, and may be freely modified for implementation without departing from the scope of claims of the present invention and the scope of their equivalents. Components of embodiments described below may be combined as appropriate. In the drawings, the same components are denoted by the same reference numerals, and descriptions thereof may be omitted.

The terms “upstream” and “downstream” refer to upstream and downstream in the conveyance direction of granulated particles in the production method of an electrode active material layer, unless otherwise specified.

In the following description, a direction of an element being “parallel”, “perpendicular” or “orthogonal” may allow an error within the range of not impairing the advantageous effects of the present invention, for example, within a range of +5° unless otherwise specified.

<1. Summary of Production Apparatus of Electrode Active Material Layer>

A production apparatus of an electrode active material layer according to the present invention includes a feeding unit that feeds granulated particles containing an electrode active material and a binder, a conveying unit that conveys the granulated particles that have been fed from the feeding unit, a support unit that supports the granulated particles that have been conveyed by the conveying unit, a squeegee unit that is disposed to be spaced above the support unit and that levels the granulated particles to form a granulated particle layer, and a rolling unit that rolls the granulated particle layer to form an electrode active material layer. The production apparatus of an electrode active material layer includes a pair of stock guide units each having a plate shape. The paired stock guide units each independently are disposed to be parallel to side surfaces of the squeegee unit. The paired stock guide units are disposed so that an upstream end portion of the stock guide unit is located upstream of a position of a gap portion between the support unit and the squeegee unit, so that a downstream end portion of the stock guide unit is located downstream of the position of the gap portion, and so that a distance between side surfaces of the paired stock guide units is equivalent to a width of the electrode active material layer.

According to the present invention, the paired stock guide units each independently are disposed to be parallel to the side surfaces of the squeegee unit, and are disposed so that the upstream end portion of the stock guide unit is located upstream of the position of the gap portion between the support unit and the squeegee unit and so that the downstream end portion of the stock guide unit is located downstream of the position of the gap portion. Accordingly, when the granulated particles pass through the gap portion provided between the support unit and the squeegee unit, it is possible to suppress a lowering of smoothness at the end portions caused by flowing of the granulated particles to the outer side.

Also, the paired stock guide units are disposed so that the distance between the side surfaces thereof is equivalent to the width of the electrode active material layer. Accordingly, when the granulated particles are leveled, the granulated particles can be leveled to have a desired forming width of the electrode active material layer, so that the weight per unit area of the granulated particles can be adjusted over the width direction. In particular, fluctuation between the weight per unit area at the center portion and that at the end portion in the width direction can be reduced. As a result, rolling unevenness due to the fluctuation in the weight per unit area can be suppressed, and the end portion strength of the electrode active material layer can thus be made favorable.

Furthermore, by disposing the plate-like stock guide units, the granulated particles can be prevented from flowing to the outside, and the yield of the granulated particles can thus be improved.

The production apparatus of an electrode active material layer according to the present invention is not particularly limited as long as the apparatus includes the feeding unit, the conveying unit, the support unit, the squeegee unit, the pair of plate-like stock guide units, and the rolling unit. Preferred embodiments include an aspect (first embodiment) in which the apparatus further includes a substrate feeding unit and a substrate conveying unit disposed upstream of the feeding unit and an aspect (second embodiment) in which the apparatus further includes a substrate feeding unit and a substrate conveying unit downstream of the squeegee unit. Hereinbelow, the production apparatus of an electrode active material layer will be described, using these embodiments as examples.

1.1. Production Apparatus of Electrode Active Material Layer According to First Embodiment FIG. 1 is a side view schematically illustrating a production apparatus of an electrode active material layer according to an embodiment of the present invention. A production apparatus of an electrode active material layer 100*a* illustrated in FIG. 1 includes a feeding unit 10, a conveying unit 20, a support unit 30, a squeegee unit 40 and a pair of plate-like stock guide units 50, and a rolling unit 60 in this order from the upstream side in the conveyance direction of granulated particles 2. In the production apparatus 100*a*, an example is illustrated in which a substrate feeding unit 21 disposed upstream of the feeding unit 10 and a substrate conveying unit 22 that conveys a substrate 1 fed from the substrate feeding unit 21 to the rolling unit 60 are provided, and in which the substrate conveying unit 22 including the substrate 1 serves as the conveying unit 20 for the granulated particles 2. Also, in the production apparatus 100*a*, a part of the conveying unit 20 is usually disposed on the support unit 30.

The production apparatus 100*a* can also include, between the substrate feeding unit 21 and the feeding unit 10, a coating unit 80 that applies onto the substrate 1 a binder coating liquid containing a binder, as necessary. The production apparatus 100*a* can further include a collecting unit 70 that collects the substrate 1 (electrode 5) provided with an electrode active material layer 4 downstream of the rolling unit 60, as necessary. In a case where the production apparatus 100*a* includes the collecting unit 70, the substrate conveying unit 22 usually conveys the substrate 1, which has been fed from the substrate feeding unit 21, to the collecting unit 70.

In the production apparatus 100*a*, the feeding unit 10 feeds the granulated particles 2 containing an electrode active material and a binder. The conveying unit 20 conveys the granulated particles 2 that have been fed from the feeding unit 10. The support unit 30 supports the granulated particles 2 that have been conveyed by the conveying unit 20. The squeegee unit 40 is disposed to be spaced above the support unit 30 and levels the granulated particles 2 to form a granulated particle layer 3. In the production apparatus 100*a*, the support unit 30 and the squeegee unit 40 each have a columnar shape (roll shape) and are disposed so that the respective rotation axes are parallel to each other. In the production apparatus 100*a*, the support unit 30 and the squeegee unit 40 are rotated in the same direction of rotation and cause the granulated particles 2 to pass through a gap provided between the support unit 30 and the squeegee unit 40 to level the granulated particles 2 and form the granulated particle layer 3. The rolling unit 60 rolls the granulated particle layer 3 to form the electrode active material layer 4. In the production apparatus 100*a*, an example is shown in which the rolling unit 60 is a pair of rolling rolls 61 and 62, and in which the support unit 30 also serves as the rolling roll 61 of the rolling rolls.

Figure 2:
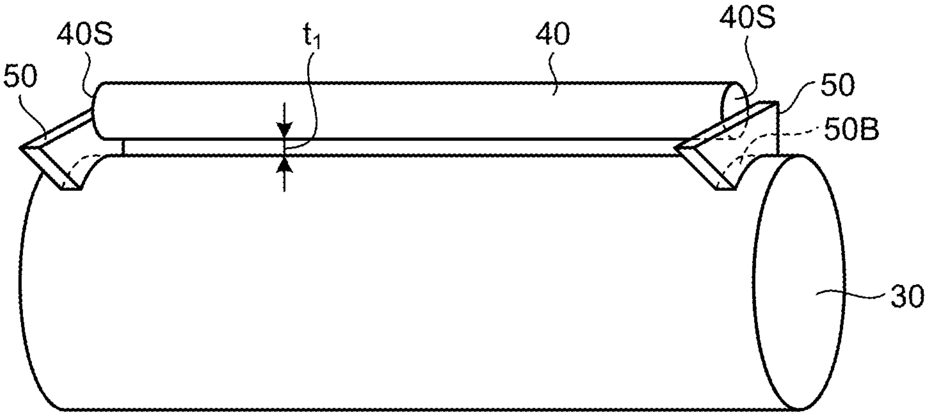
FIG. 2 is a perspective view schematically illustrating a support unit, a squeegee unit, and stock guide units in the production apparatus illustrated in FIG. 1.
Figure 3:
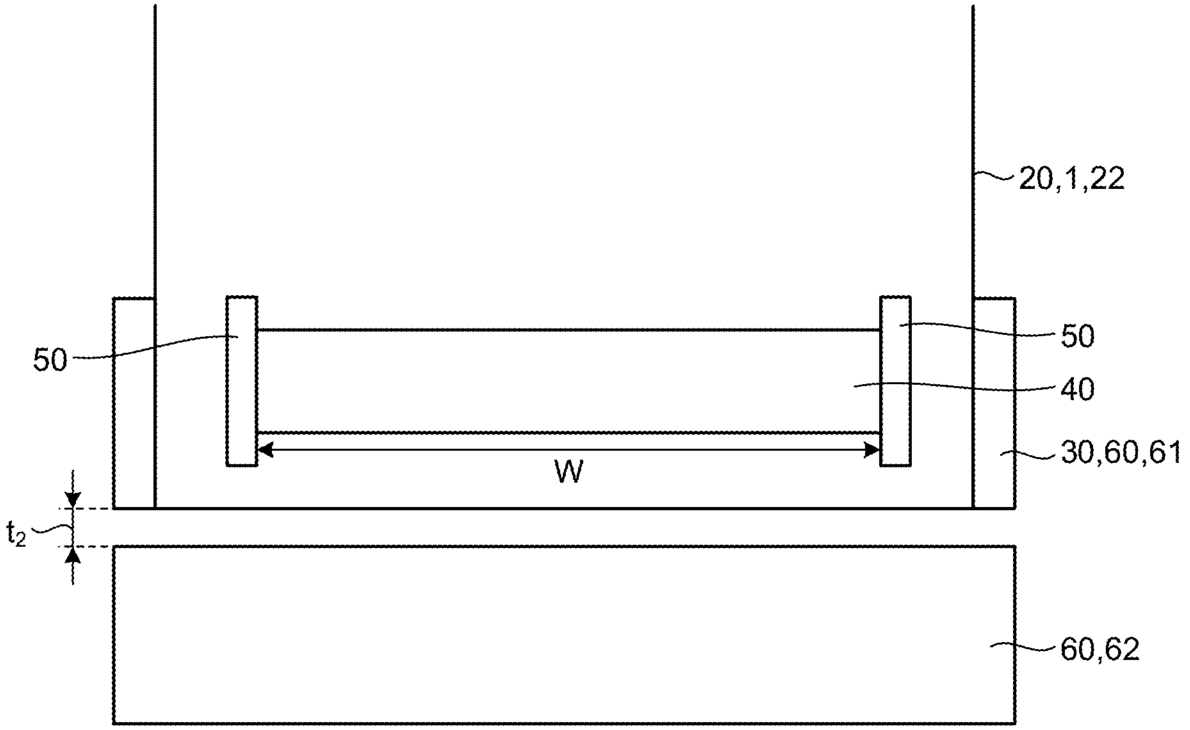
FIG. 3 is a top view of a conveying unit, the support unit, the squeegee unit, the stock guide units, and a rolling unit in the production apparatus illustrated in FIG. 1 as viewed from the squeegee unit side.
Figure 4:
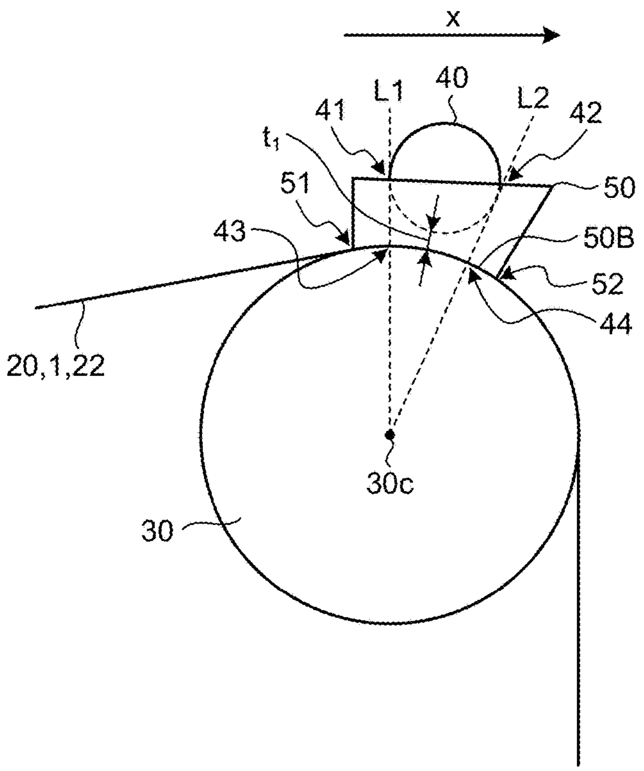
FIG. 4 is a side view schematically illustrating the conveying unit, the support unit, the squeegee unit, and the stock guide unit in the production apparatus illustrated in FIG. 1.

The production apparatus 100*a* further includes the pair of plate-like stock guide units 50. FIG. 2 is a perspective view schematically illustrating the support unit 30, the squeegee unit 40, and the pair of plate-like stock guide units 50 in the production apparatus 100*a*, FIG. 3 is a top view of the conveying unit 20, the support unit 30, the squeegee unit 40, the pair of plate-like stock guide units 50, and the rolling unit 60 in the production apparatus 100*a* as viewed from the stock guide units 50 side, and FIG. 4 is a side view schematically illustrating the conveying unit 20, the support unit 30, the squeegee unit 40, and the pair of plate-like stock guide units 50. In the production apparatus 100*a*, the paired stock guide units 50 each independently are disposed to be parallel to side surfaces 40S of the squeegee unit. In addition, as illustrated in FIG. 4, the paired stock guide units 50 each independently are disposed so that an upstream end portion 51 of the stock guide unit 50 is located upstream of the position of a gap portion $t_1$ between the support unit 30 and the squeegee unit 40 and so that a downstream end portion 52 of the stock guide unit 50 is located downstream of the position of the gap portion $t_1$. The paired stock guide units 50 are disposed so that a distance W between the side surfaces thereof is equivalent to the width of the electrode active material layer. In FIG. 4, the conveyance direction of the granulated particles is a direction indicated by the arrow x.

Figure 5:
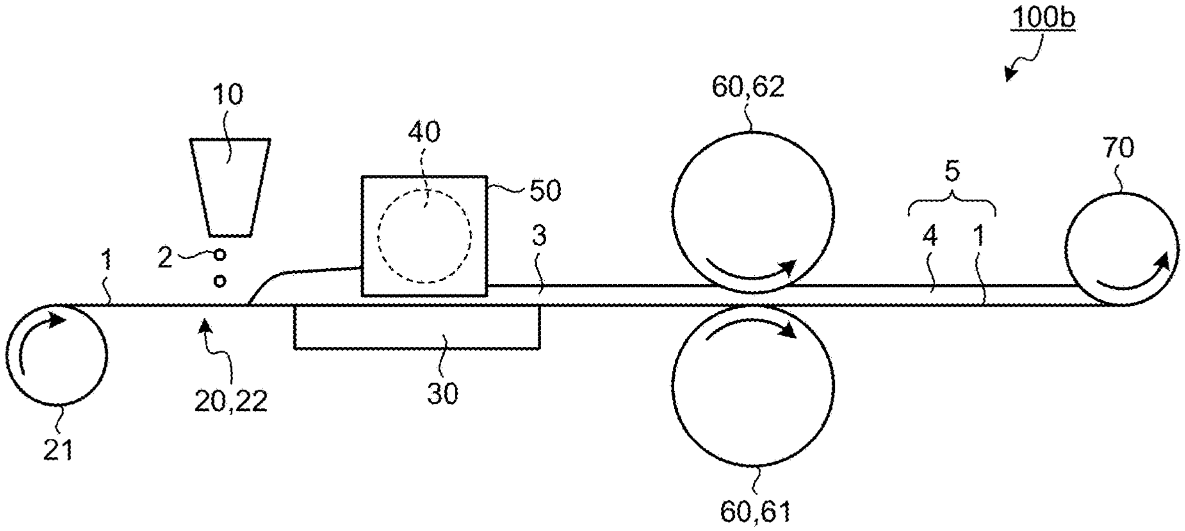
FIG. 5 is a side view schematically illustrating a modification of the production apparatus of an electrode active material layer according to the first embodiment of the present invention.
Figure 6:
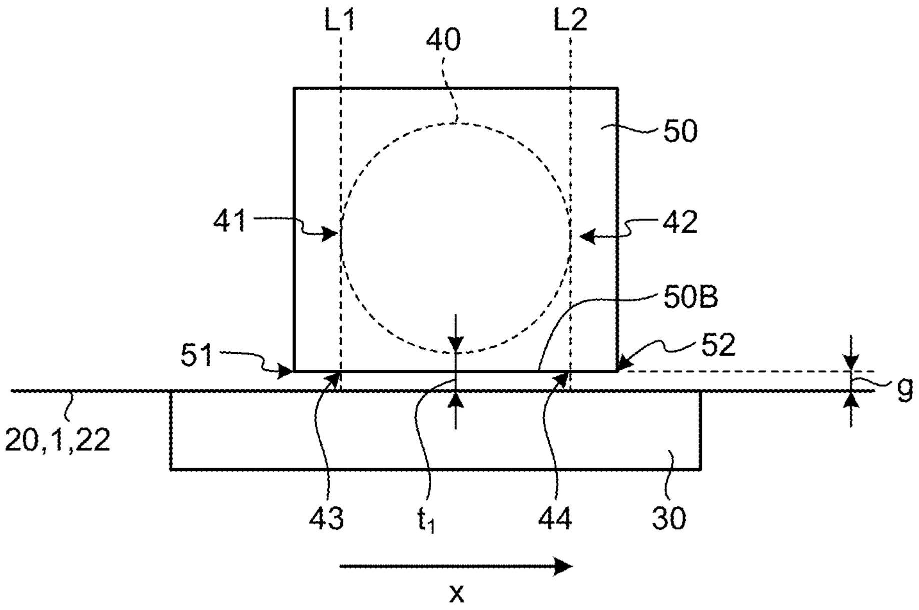
FIG. 6 is a side view schematically illustrating the conveying unit, the support unit, the squeegee unit, and the stock guide unit in the production apparatus illustrated in FIG. 5.

FIG. 5 is a side view schematically illustrating a modification of the production apparatus of an electrode active material layer according to the first embodiment of the present invention, and FIG. 6 is a side view schematically illustrating the conveying unit 20, the support unit 30, the squeegee unit 40, and the stock guide unit 50 of a production apparatus 100*b* illustrated in FIG. 5. In the production apparatus 100*b*, an example is shown in which the support unit 30 is a plate-like support unit 30.

<1.1.1. Feeding Unit>

The feeding unit feeds granulated particles containing an electrode active material and a binder and usually feeds a predetermined amount of the granulated particles to the conveying unit. As such a feeding unit, for example, a hopper can be used. The hopper usually includes a housing unit that houses the granulated particles, an inlet used to put the granulated particles into the housing unit, and an outlet for discharging the granulated particles out of the housing unit.

The position of the feeding unit in the production apparatus is usually upstream of the squeegee unit and enables the granulated particles to be fed to the conveying unit. For example, as illustrated in FIG. 1, the feeding unit can be disposed above the substrate conveying unit 22 located upstream of the squeegee unit 40.

The feeding unit is disposed so that the granulated particles can be fed at an optional position in the width direction of the conveying unit (a direction orthogonal to the conveyance direction of the granulated particles).

In an embodiment, the feeding unit is preferably disposed so that the granulated particles can be fed at a center region in the width direction of the conveying unit. Specifically, it is preferable to dispose the outlet of the feeding unit in a range in which the distance from the center in the width direction of the conveying unit is 40% of the entire length in the width direction of the conveying unit or preferably 30% of the entire length. As illustrated in FIGS. 1 and 3, in a case where the conveying unit 20 is the substrate conveying unit 22 including the substrate 1, it is preferable to dispose the outlet of the feeding unit in a range in which the distance from the center of the substrate is 40% of the entire length in the width direction of the substrate or preferably 30% of the entire length.

In another embodiment, the feeding unit is preferably disposed so that the granulated particles can be fed over the entire length in the width direction of the conveying unit. As illustrated in FIGS. 1 and 3, in a case where the conveying unit 20 is the substrate conveying unit 22 including the substrate 1, it is preferable to dispose the outlet of the feeding unit in a range of the entire length in the width direction of the substrate.

The distance from the surface of the conveying unit to the outlet of the feeding unit can be appropriately selected depending on the feed amount of the granulated particles, the size of the conveying unit in the width direction, and the like.

The feeding unit usually feeds the granulated particles so that the weight per unit area of the material for the electrode active material layer on the substrate is a desired amount.

<1.1.2. Conveying Unit>

The conveying unit conveys the granulated particles fed from the feeding unit. The conveying unit conveys the granulated particles to the support unit, the squeegee unit, and the rolling unit that are located downstream of the conveying unit. In the production apparatus according to the first embodiment, the conveying unit conveys the granulated particles to cause the granulated particles to pass through a gap provided between the support unit and the squeegee unit, whereby the granulated particles can be leveled and the granulated particle layer can be formed. Also, in the production apparatus according to the first embodiment, the conveying unit conveys the granulated particle layer to cause the granulated particle layer to pass between the rolling rolls 61 and 62 of the rolling unit 60, whereby the granulated particle layer can be rolled and the electrode active material layer can be formed. As such a conveying unit, the substrate conveying unit 22 including the substrate 1 can be used as illustrated in FIG. 1, for example.

<1.1.3. Support Unit>

The support unit supports the granulated particles conveyed by the conveying unit. When the granulated particles are leveled by the squeegee unit to be described below, the support unit supports the granulated particles spreading in the planar direction of the support unit. In the first embodiment, usually, a part of the conveying unit (substrate) is provided on the support unit, and the support unit supports the granulated particles via the conveying unit (substrate).

The shape of the support unit is a shape that enables the granulated particles to be supported and can be, for example, a roll shape illustrated in FIG. 1 or a plate shape illustrated in FIGS. 5 and 6. Among these, the shape of the support unit is preferably a roll shape. The reason for this is that the support unit with a roll shape makes it easier to obtain a configuration that also serves as a part of the rolling unit to be described below, whereby simplification and space reduction of the production apparatus can be achieved.

In a case where the support unit has a roll shape, the radius of the support unit can be appropriately set to an optional radius depending on the size of the electrode active material layer and the like and may be, for example, 50 mm or more, and preferably 100 mm or more, and for example, 500 mm or less, and preferably 400 mm or less.

<1.1.4. Squeegee Unit>

The squeegee unit is disposed to be spaced above the support unit and levels granulated particles to form the granulated particle layer.

As illustrated in FIG. 2, the squeegee unit 40 usually has a roll shape. The squeegee unit 40 is usually disposed to have a predetermined gap from the surface of the support unit 30, and causes the granulated particles to pass through the gap to level the granulated particles and form the granulated particle layer.

The size of the gap provided between the support unit and the squeegee unit can be appropriately adjusted depending on the thickness of a desired electrode active material layer. In a case where the rolling unit has a pair of rolling rolls, the gap between the support unit and the squeegee unit is usually formed to be larger than the gap between the paired rolling rolls.

Also, in a case where the support unit has a roll shape, the squeegee unit and the support unit are disposed so that the respective rotation axes are parallel to each other. The direction of rotation of the support unit and that of the squeegee unit can be either the same direction or opposite directions.

The radius of the squeegee unit can be appropriately selected depending on the form of the support unit, the feed amount of the granulated particles, and the like and may be, for example, 20 mm or more, and preferably 40 mm or more, and for example, 300 mm or less, and preferably 250 mm or less.

The radius of the squeegee unit may be larger than, smaller than, or equal to the radius of the support unit.

<1.1.5. Pair of Plate-Like Stock Guide Units>

The pair of plate-like stock guide units is a member that prevents the granulated particles from flowing outside of a desired region in the width direction of the support unit when the granulated particles are leveled by the support unit and the squeegee unit. The pair of plate-like stock guide units, as well as the squeegee unit, is usually disposed above the support unit.

The stock guide unit has a plate shape, and is usually disposed so that the surface part of the plate is parallel to the side surface of the squeegee unit and so that the thickness part of the plate faces the support unit. The shape of the stock guide unit is preferably a shape that enables the stock guide unit to be disposed to conform to the shape of the support unit. For example, as illustrated in FIGS. 1 to 4, in a case where the support unit 30 has a roll shape, a surface 50B (bottom surface) of the stock guide unit 50 facing the support unit 30 preferably has a curved shape. In this case, a ratio (R1/R0) of a radius of curvature R1 of the curved surface of the stock guide unit relative to a radius of curvature R0 of the curved surface of the roll of the support unit is, for example, 0.95 or more, and preferably 0.98 or more, and for example, 1.10 or less, and preferably 1.05 or less. R1/R0 is ideally 1.00, in which case, the radius of curvature R0 of the curved surface of the roll of the support unit and the radius of curvature R1 of the curved surface of the stock guide unit are equal to each other.

In addition, for example, as illustrated in FIGS. 5 and 6, in a case where the support unit 30 has a plate shape, the bottom surface of the stock guide unit 50 preferably has a flat shape.

The paired stock guide units each independently are disposed to be parallel to the side surfaces of the squeegee unit. Also, the paired stock guide units are disposed so that the distance W between the side surfaces of the paired stock guide units is equivalent to the width of the electrode active material layer. For example, as illustrated in FIG. 3, in a case where the length of the squeegee unit 40 in the axial direction is equivalent to the width of the electrode active material layer, the paired stock guide units 50 are disposed so that the side surfaces thereof which face each other are parallel to the side surfaces (end faces) of the squeegee unit 40 with the squeegee unit 40 interposed between the side surfaces of the stock guide units 50.

The paired stock guide units each independently are disposed so that the upstream end portion of the stock guide unit is located upstream of the position of the gap portion between the support unit and the squeegee unit and so that the downstream end portion of the stock guide unit is located downstream of the position of the gap portion. Also, usually, the side surfaces of the paired stock guide units each independently are disposed to be continuous from the upstream end portion to the downstream end portion in the conveyance direction of the granulated particles.

Here, the gap portion between the support unit and the squeegee unit refers to a portion in which the gap between the support unit and the squeegee unit is the smallest.

The state in which the upstream end portion of the stock guide unit is located upstream of the position of the gap portion between the support unit and the squeegee unit indicates a state in which the upstream end portion in at least the bottom portion of the stock guide unit is located upstream of the position of the gap portion. In a case where the surface of the stock guide unit opposed to and along the support unit is referred to as a bottom surface (50B in FIG. 2), the bottom portion of the stock guide unit indicates a portion (50B in FIG. 4) equivalent to the bottom surface when the stock guide unit is viewed in the side surface direction. The state in which the upstream end portion of the stock guide unit is located upstream of the position of the gap portion can be confirmed by the state in which, as illustrated in FIGS. 4 and 6, the upstream end portion 51 in the bottom portion 50B of the stock guide unit is located upstream of the gap portion $t_1$.

Similarly, the state in which the downstream end portion of the stock guide unit is located downstream of the position of the gap portion between the support unit and the squeegee unit indicates a state in which the downstream end portion in at least the bottom portion of the stock guide unit is located downstream of the position of the gap portion, and can be confirmed by the state in which, as illustrated in FIGS. 4 and 6, the downstream end portion 52 in the bottom portion 50B of the stock guide unit is located downstream of the gap portion $t_1$.

In the first embodiment, for example, the paired stock guide units are preferably independently disposed so that the upstream end portion of the stock guide unit is located upstream of the position of the upstream end portion of the squeegee unit and so that the downstream end portion of the stock guide unit is located downstream of the position of the downstream end portion of the squeegee unit. This configuration is preferred because it can effectively suppress a lowering of the end portion smoothness and a lowering of the yield, which are caused by the flow of the granulated particles to the outside.

Here, in a case where both the support unit 30 and the squeegee unit 40 have roll shapes as illustrated in FIG. 4, the upstream end portion of the squeegee unit indicates a tangent point 41 between a tangent line L1, which passes a center 30C of the support unit 30 and comes in contact with the squeegee unit 40 upstream, and the squeegee unit 40. On the other hand, in a case where the support unit 30 has a plate shape and the squeegee unit 40 has a roll shape as illustrated in FIG. 6, the upstream end portion of the squeegee unit indicates the tangent point 41 between the tangent line L1, which is orthogonal to the surface of the support unit 30 and comes in contact with the squeegee unit upstream, and the squeegee unit 40.

The state in which the upstream end portion of the stock guide unit is located upstream of the position of the upstream end portion of the squeegee unit indicates a state in which the upstream end portion in at least the bottom portion of the stock guide unit is located upstream of the position of the upstream end portion of the squeegee unit, and can be confirmed by the state in which, as illustrated in FIGS. 4 and 6, the upstream end portion 51 in the bottom portion 50B of the stock guide unit is located upstream of an intersection point 43 between the aforementioned tangent line L1 and the bottom portion of the stock guide unit.

Similarly, in a case where both the support unit 30 and the squeegee unit 40 have roll shapes as illustrated in FIG. 4, the downstream end portion of the squeegee unit indicates a tangent point 42 between a tangent line L2, which passes the center 30C of the support unit 30 and comes into contact with the squeegee unit 40 downstream, and the squeegee unit 40. On the other hand, in a case where the support unit 30 has a plate shape and the squeegee unit 40 has a roll shape as illustrated in FIG. 6, the downstream end portion of the squeegee unit indicates the tangent point 42 between the tangent line L2, which is orthogonal to the surface of the support unit 30 and comes in contact with the squeegee unit downstream, and the squeegee unit 40.

The state in which the downstream end portion of the stock guide unit is located downstream of the position of the downstream end portion of the squeegee unit indicates a state in which the downstream end portion in at least the bottom portion of the stock guide unit is located downstream of the position of the downstream end portion of the squeegee unit, and can be confirmed by the state in which, as illustrated in FIGS. 4 and 6, the end portion 52 in the bottom portion 50B of the stock guide unit is located downstream of an intersection point 44 between the aforementioned tangent line L2 and the bottom portion of the stock guide unit.

How far the upstream end portion and the downstream end portion of the stock guide unit are disposed from the gap portion between the support unit and the squeegee unit can be appropriately determined depending on the distance of the gap portion, the shapes and sizes of the support unit and the squeegee unit, the positional relationship between the support unit and the squeegee unit, and the like. In a case where the distance from the gap portion to the upstream end portion in the bottom portion of the stock guide unit is D1, the ratio of the distance D1 to the radius of the squeegee unit may be, for example, 0.05 or more, 0.5 or more, 1.0 or more, and over 1.0. Also, the ratio of the distance D1 to the radius of the squeegee unit may be, for example, 4.0 or less, 3.0 or less, and 2.0 or less. In a case where the distance from the gap portion to the downstream end portion in the bottom portion of the stock guide unit is D2, the ratio of the distance D2 to the radius of the squeegee unit may be, for example, 0.05 or more, 0.5 or more, 1.0 or more, and over 1.0. Also, the ratio of the distance D2 to the radius of the squeegee unit may be, for example, 4.0 or less, 3.0 or less, and 2.0 or less. In FIGS. 4 and 6, the distance D1 is a distance from the position of the gap portion $t_1$ to the upstream end portion 51 in the bottom portion of the stock guide unit, and the distance D2 is a distance from the position of the gap portion $t_1$ to the downstream end portion 52 in the bottom portion of the stock guide unit.

As described above, in the production apparatus according to the first embodiment, a part of the conveying unit is provided on the support unit. In this case, the stock guide unit and the conveying unit may be in contact with each other. The amount of contact between the stock guide unit and the conveying unit can be appropriately adjusted in consideration of damage or the like to the conveying unit that can occur because of the contact with the stock guide unit. For example, in a case where the support unit has a roll shape, where the conveying unit is provided along the roll of the support unit, and where the surface of the stock guide unit on the bottom portion side is a curved surface conforming to the roll of the support unit, the ratio of the contact length of the stock guide unit to the circumference length of the support unit is preferably 7.5% or more, more preferably 7.7% or more, and still more preferably 10% or more, and is preferably 17.5% or less, more preferably 178 or less, still more preferably 13.5% or less, and particularly preferably 13% or less.

The stock guide unit preferably has a small friction with the substrate serving as the conveying unit. Specifically, the friction coefficient of the stock guide unit is preferably 0.50 or less, and more preferably 0.40 or less. The friction coefficient of the stock guide unit is ideally 0, and the lower limit may be 0.04 or more. The friction coefficient of the stock guide unit indicates a static friction coefficient between the stock guide unit and the substrate and can be measured in conformity to JIS K7125. Specifically, the friction coefficient of the stock guide unit can be measured by a method described in Examples.

In addition, since a lower friction coefficient of the stock guide unit facilitates a lowering of adhesion between the granulated particles and the stock guide unit, a lowering of the end portion smoothness, possibly occurring in a case where the granulated particles adhere to the stock guide unit, can be suppressed.

Alternatively, in the production apparatus, as illustrated in FIG. 6, the stock guide unit and the support unit may be disposed to have a gap g therebetween. In this case, the size of the gap g is adjusted to a degree of being able to prevent the granulated particles from flowing out of the gap g. The size of the gap is usually 70% or less, and preferably 50% or less, of the volume-average particle diameter (D50) of the granulated particles, and is usually 10% or more, and preferably 20% or more, of the volume-average particle diameter (D50) of the granulated particles. By making the size of the gap fall within the aforementioned range, it becomes possible to prevent the granulated particles from flowing out of the gap and to reduce damage to the conveying unit.

The material constituting the stock guide unit is not limited to a particular material. Examples of the material for the stock guide unit may include poly(ethylene tetrafluoride) (PTFE), poly(acrylonitrile butadiene styrene) (ABS), polypropylene (PP), polystyrene (PS), polyethylene (PE), ultra-high-molecular-weight polyethylene, monomer casting nylon (UMC), poly(vinyl chloride) (PVC), polyacetal, and a methacrylic resin.

The stock guide unit is a plate-like member, and the thickness thereof can be a thickness with which the side surfaces of the paired stock guide units can hold the granulated particles therebetween. The thickness of the stock guide unit may be, for example, 10 mm or more and 30 mm or less.

Figure 7A:
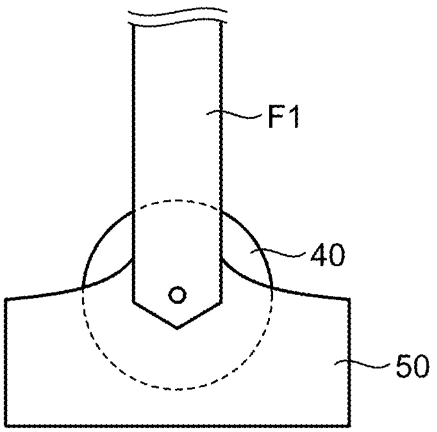
FIG. 7A is a side view schematically illustrating an example of a method for fixing the stock guide unit.
Figure 7B:
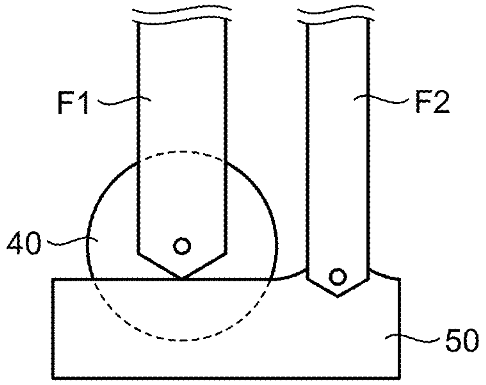
FIG. 7B is a side view schematically illustrating another example of the method for fixing the stock guide unit.

The stock guide unit is disposed to be parallel to the side surface of the squeegee unit at the position at which the stock guide unit does not inhibit rotation of the squeegee unit. The stock guide unit can be disposed to come in contact with the side surface of the squeegee unit as long as the stock guide unit does not inhibit rotation of the squeegee unit. FIG. 7A is a side view schematically illustrating an example of a method for fixing the stock guide unit. FIG. 7B is a side view schematically illustrating another example of the method for fixing the stock guide unit. For example, the stock guide unit 50 may be fixed to a fixing unit F1 for the squeegee unit 40 together with the squeegee unit 40 as illustrated in FIG. 7A, or may be fixed by providing a fixing unit F2 separately from the fixing unit F1 for the squeegee unit 40 as illustrated in FIG. 7B.

<1.1.6. Rolling Unit>

The rolling unit rolls the granulated particle layer to form the electrode active material layer. The rolling unit rolls the granulated particle layer by applying pressure onto the granulated particle layer in the direction perpendicular to the planar direction of the granulated particle layer to form the electrode active material layer. As the granulated particles are compressed in the rolling unit, the adhesion among the granulated particles can be increased, and the adhesion among the electrode active materials contained in the granulated particles can be increased. Furthermore, the adhesion among the components of the entire layer can be increased, and the strength of the electrode active material layer can be increased.

As the rolling unit, for example, a pair of rolling rolls can be used. In a case where the aforementioned support unit has a roll shape, the support unit can be used as one of the paired rolling rolls.

In a case where the pair of rolling rolls is used as the rolling unit, the gap between the rolling rolls is adjusted to adjust the pressure for pressing the granulated particle layer. For example, by adjusting the difference between the size of the gap between the support unit and the squeegee unit and the size of the gap between the rolling rolls, the pressure for pressing can be adjusted. In addition, by doing so, the density of the electrode active material layer can be adjusted. Usually, the distance between the rolling rolls is adjusted to be smaller than the size of the gap portion between the support unit and the squeegee unit. The specific distance can be appropriately adjusted depending on the thickness and density of the electrode active material layer.

Examples of the material for the circumferential surfaces of the rolling rolls 61 and 62 may include a rubber, metal, and an inorganic material.

The rolling roll 62 may have a mechanism for heating the circumferential surface thereof. This mechanism can roll the granulated particle layer 3 while heating it. By rolling and heating the granulated particle layer 3, the binder contained in the granulated particles 2 can be softened or melted. As a result, the granulated particles 2 can be bound to each other more firmly.

<1.1.7. Optional Components>

In a production apparatus of an electrode active material layer according to the present invention, optional components can be disposed as necessary in addition to the aforementioned components.

For example, as optional components, the coating unit disposed upstream of the feeding unit of the production apparatus to apply the binder coating liquid onto the substrate can be included. In a case where the production apparatus includes the coating unit, the binder coating liquid can be applied onto the substrate to form a binder coating liquid layer, and the granulated particles can be fed on the binder coating liquid layer. Therefore, the granulated particles can adhere to the substrate. Examples of the coating unit that can be included in the production apparatus include a slot die head, a gravure head, a bar coat head, and a knife coat head.

The production apparatus can include a collection unit that collects the substrate on which the electrode active material layer has been formed, downstream of the rolling unit. Examples of the collection unit may include a roll for winding up the substrate.

Figure 8:
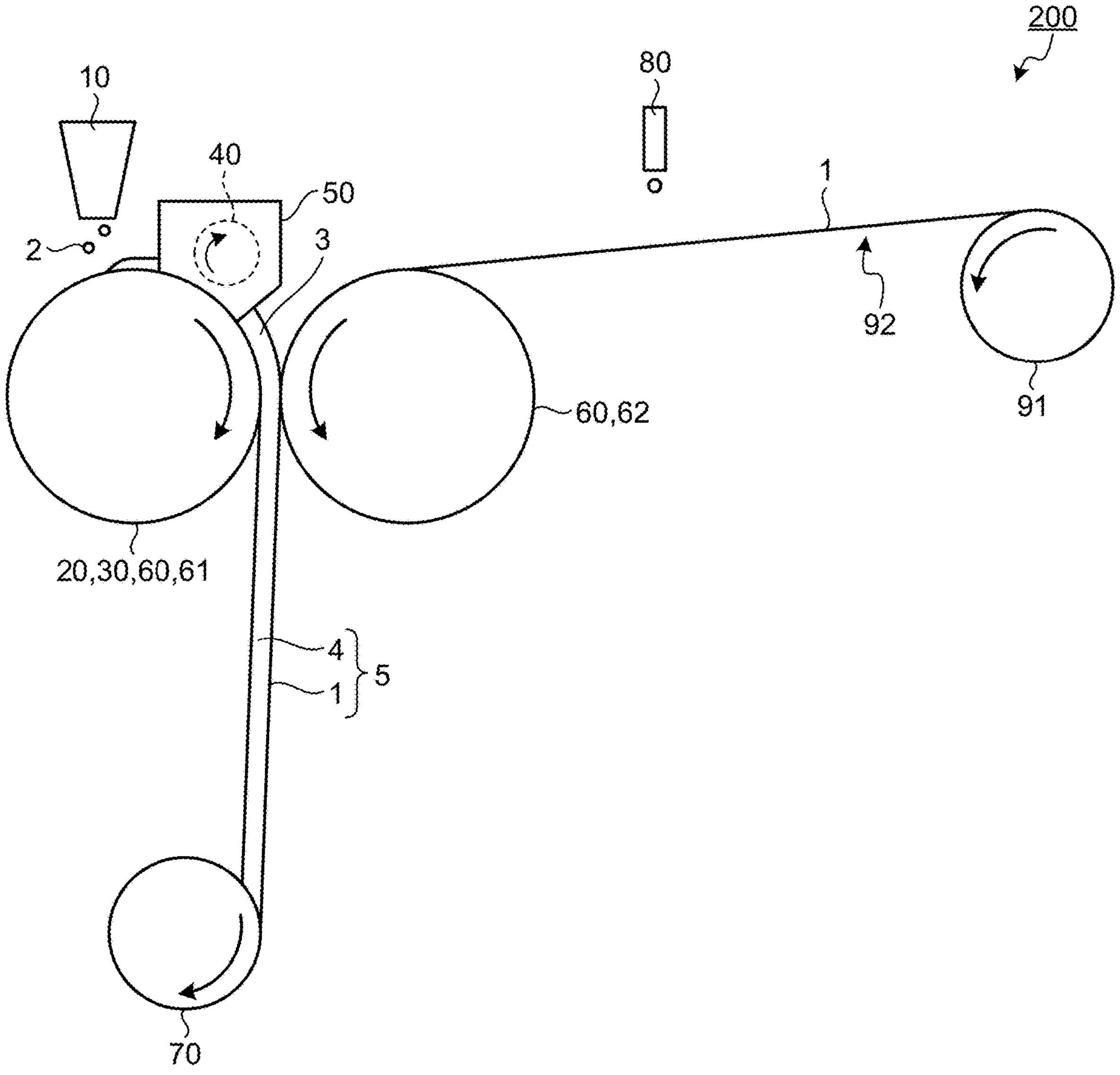
FIG. 8 is a side view schematically illustrating a production apparatus of an electrode active material layer according to a second embodiment of the present invention.

1.2. Production Apparatus of Electrode Active Material Layer According to Second Embodiment FIG. 8 is a side view schematically illustrating a production apparatus of an electrode active material layer according to a second embodiment of the present invention. A production apparatus of an electrode active material layer 200 illustrated in FIG. 8 includes the feeding unit 10, the support unit 30 serving also as the conveying unit 20, the squeegee unit 40 and the pair of plate-like stock guide units 50, and the rolling unit 60 in this order from the upstream side in the conveyance direction of the granulated particles 2. The production apparatus 200 includes a substrate feeding unit 91 disposed downstream of the squeegee unit 40 and upstream of the rolling unit 60 and a substrate conveying unit 92 that conveys the substrate 1, which has been fed from the substrate feeding unit 91, to the rolling unit 60. The production apparatus 200 can also include, between the substrate feeding unit 91 and the rolling unit 60, the coating unit 80 for applying the binder coating liquid onto the substrate 1, as necessary. The production apparatus 200 can further include the collecting unit 70 that collects the substrate 1 provided with the electrode active material layer 4 (the electrode 5) downstream of the rolling unit 60, as necessary.

In the production apparatus 200, the roll-shaped support unit 30 serves also as the conveying unit 20. As the feeding unit 10 is disposed above the support unit 30, the feeding unit 10 feeds the granulated particles 2 so that the granulated particles 2 directly come in contact with the support unit 30. As the support unit 30 rotates, the support unit 30 conveys the granulated particles 2 fed from the feeding unit 10 and causes the granulated particles 2 to pass through the gap between the support unit 30 and the squeegee unit 40 to level the granulated particles 2 and form the granulated particle layer 3. The rolling unit 60 rolls the granulated particle layer 3, which has been formed on the support unit 30, between the substrate 1, which has been fed from the substrate feeding unit 91, and the support unit 30. The rolling unit 60 also serves as a transfer unit that transfers the electrode active material layer 4 onto the substrate 1. FIG. 8 illustrates an example in which the rolling unit 60 is a pair of rolling rolls 61 and 62, and in which the support unit 30 also serves as the rolling roll 61 of the rolling rolls.

In the second embodiment, usually, the feeding unit is disposed above the support unit that is located upstream of the squeegee unit. The feeding unit is disposed so that the granulated particles can be fed at an optional position in the width direction of the support unit. Among these, the feeding unit is preferably disposed so that the granulated particles can be fed at a center region in the width direction of the support unit. Specifically, it is preferable to dispose the outlet of the feeding unit in a range in which the distance from the center in the width direction of the support unit is 40% of the entire length in the width direction of the support unit, and preferably 30% of the entire length in the width direction of the support unit.

In the second embodiment, since the support unit serves also as a conveying unit that conveys the granulated particles and conveys the granulated particles on the surface of the support unit, it can be considered that the conveying unit is provided on the support unit. Such a support unit preferably has a roll shape. In the second embodiment as well, the conveying unit and the stock guide unit may be in contact with each other. In this case, the contact length, and the friction coefficient between the support unit serving as the conveying unit and the stock guide unit, can fall in similar ranges to those of the contact length and the friction coefficient between the conveying unit and the stock guide unit in the first embodiment.

In a case where the granulated particle layer is formed directly on the support unit, the substrate is fed from the substrate feeding unit disposed downstream of the squeegee unit and upstream of the rolling unit, and in the rolling unit, the granulated particle layer formed on the support unit is rolled between the fed substrate and the support unit, whereby the electrode active material layer can be transferred onto the substrate. In this case, the rolling unit also serves as a transfer unit that transfers the electrode active material layer onto the substrate.

The production apparatus 200 can be configured in a similar manner to the production apparatus of an electrode active material layer according to the first embodiment except for those matters described above.

1.3. Modification

The production apparatus of an electrode active material layer according to the present invention can be configured as in the following embodiment instead of the production apparatuses in the first embodiment and the second embodiment described above.

Figure 9:
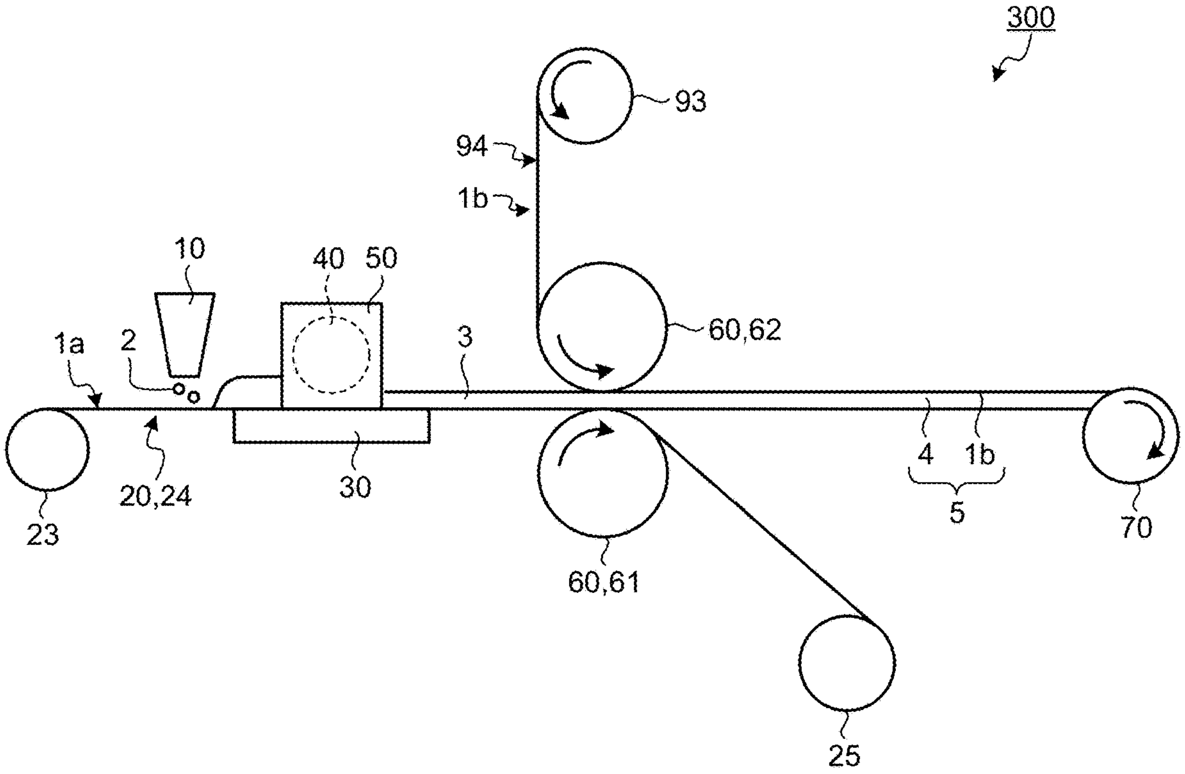
FIG. 9 is a side view schematically illustrating a production apparatus of an electrode active material layer according to another embodiment of the present invention.

FIG. 9 is a side view schematically illustrating a production apparatus of an electrode active material layer according to another embodiment of the present invention. A production apparatus 300 includes the feeding unit 10, the conveying unit 20, the support unit 30, the squeegee unit 40 and the pair of plate-like stock guide units 50, and the rolling unit 60 in this order from the upstream side in the conveyance direction of the granulated particles 2. The production apparatus 300 includes, upstream of the feeding unit 10, a substrate feeding unit 23 that feeds a first substrate 1*a*, and a first substrate conveying unit 24 that conveys the first substrate 1*a* from the feeding unit 10 to a collecting unit 25 for the first substrate 1*a* disposed downstream of the rolling unit 60. The first substrate conveying unit 24 including the first substrate 1*a* serves also as the conveying unit 20 for the granulated particles. The production apparatus 300 includes a feeding unit 93 for a second substrate 1*b* disposed downstream of the squeegee unit 40 and upstream of the rolling unit 60, and a second substrate conveying unit 94 that conveys the second substrate 1*b* to the rolling unit 60. In the production apparatus 300, the granulated particle layer 3 formed on the first substrate 1*a* is rolled between the first substrate 1*a* and the second substrate 1*b* in the rolling unit 60, whereby the electrode active material layer 4 is formed, the electrode active material layer 4 is transferred onto the second substrate 1*b*, and the first substrate 1*a* is peeled from the electrode active material layer 4.

The production apparatus in FIG. 9 can be configured in a similar manner to the production apparatuses according to the first embodiment and the second embodiment except that two sets of the substrate feeding unit and the substrate conveying unit are provided at two locations upstream of the feeding unit and downstream of the squeegee unit.

<2. Production Method of Electrode Active Material Layer>

A production method of an electrode active material layer according to the present invention is a production method of an electrode active material layer using the production apparatus in <1. Summary of Production apparatus of electrode active material layer> described above, and includes a step (A) of feeding the granulated particles from the feeding unit, a step (B) of conveying the granulated particles that have been fed, a step (C) of disposing on the support unit the conveyed granulated particles and leveling the granulated particles using the squeegee unit to form the granulated particle layer between the side surfaces of the pair of stock guide units, and a step (D) of rolling the granulated particle layer using the rolling unit to form the electrode active material layer.

In the production method according to the present invention, disposing the granulated particles on the support unit includes a case of disposing the granulated particles on the support unit so as to bring the granulated particles into direct contact with the support unit and a case of disposing the granulated particles on the support unit via the substrate.

According to the present invention, by using the production apparatus described above, it is possible to produce the electrode active material layer excellent in the end portion smoothness and with good yield of the granulated particles.

The production method of an electrode active material layer according to the present invention may be any production method as long as the method uses the aforementioned apparatus and includes the steps (A) to (D). However, for example, the production method is preferably a production method that further includes a step of feeding the substrate before the step (A) and performing the steps (A) to (D) on the substrate, that is, a production method using the production apparatus of an electrode active material layer according to the first embodiment described above.

In addition, the production method of an electrode active material layer according to the present invention is preferably a production method that includes a step of feeding the substrate after the step (C) and in which the step (D) includes rolling the granulated particle layer, which has been formed on the support unit, between the fed substrate and the support unit using the rolling unit to transfer the electrode active material layer onto the substrate, that is, a production method using the production apparatus of an electrode active material layer according to the second embodiment described above.

Hereinbelow, a description will be provided, referring to the production method using the production apparatus of an electrode active material layer according to the first embodiment described above as a production method according to a third embodiment, and referring to the production method using the production apparatus of an electrode active material layer according to the second embodiment described above as a production method according to a fourth embodiment.

2.1. Production Method of Electrode Active Material Layer According to Third Embodiment The production method of an electrode active material layer according to the third embodiment further includes a step of feeding a substrate before the step (A), and performs the steps (A) to (D) on the substrate.

<2.1.1. Step (E): Substrate Feeding Step>

A step (E) is a step of feeding a substrate before the step (A), and specifically, a step of feeding a substrate from the upstream side of the feeding unit of the production apparatus.

As the substrate, a long-length substrate is usually fed. Herein, a “long-length” film refers to a film with the length that is 5 times or more the width thereof, and preferably a film with the length that is 10 times or more the width thereof, and specifically refers to a film having a length that allows a film to be wound up into a rolled shape for storage or transportation. The upper limit of the length thereof may be, but not particularly limited to, for example, 10,000 times or less the width.

Examples of the specific substrate may include: metal foils formed of aluminum, platinum, nickel, tantalum, titanium, stainless steel, copper, and other alloys; films containing electroconductive materials (e.g., carbon, electroconductive macromolecular materials); paper; fabric cloths formed of natural fibers, synthetic fibers, and the like; and macromolecular resin films or sheets. The substrate may be appropriately selected therefrom depending on the intended purposes. Examples of the polymers that can be contained in the macromolecular resin films or sheets may include a polyester such as polyethylene terephthalate and polyethylene naphthalate; a polyimide; a polypropylene; a polyphenylene sulfide; a polyvinyl chloride; an aramid; PEN; and PEEK.

Among these, when electrode sheets for lithium ion battery electrodes are to be produced, the preferable substrate may be a metal foil, a carbon film, and an electroconductive macromolecular film, more preferably a metal foil. Among these, it is preferable to use a copper foil, an aluminum foil, and an aluminum alloy foil from the viewpoint of electroconductivity and withstand voltage. The substrate 1 may be subjected to a surface treatment such as a coating film treatment, a punching process, a buffing process, a sand blasting process, and/or an etching process.

The thickness of the substrate is, for example, 1 μm or more, and preferably 5 μm or more, and is, for example, 1000 μm or less, and preferably 800 μm or less. The substrate may have any given width.

<2.1.2. Step (A): Supply of Granulated Particles>

The step (A) is a step of feeding the granulated particles from the feeding unit. In the third embodiment, the granulated particles are usually fed onto the substrate from the feeding unit.

The granulated particles usually contain the electrode active material and a binder, and, as necessary, may contain a dispersant, an electroconductive material, and an additive as other components.

The electrode active material contained in the granulated particles may be a positive electrode active material or a negative electrode active material. When the granulated particles are used as an electrode material for a lithium ion battery, examples of the positive electrode active material may include metal oxides that can be reversibly doped and undoped with lithium ions. Examples of such metal oxides may include lithium cobalt oxide ($LiCoO_2$), lithium nickel oxide ($LiNiO_2$), lithium manganese oxide ($LiMn_2O_4$), lithium iron phosphate ($LiFePO_4$), and ternary active materials obtained by substituting nickel and manganese for a part of lithium cobalt oxide (for example, $LiCo_{1/3}Ni_{1/3}Mn_{1/3}O_2$). As the above-mentioned positive electrode active material, one type thereof may be solely used, and two or more types thereof may also be used in combination, depending on its use purpose.

Examples of the negative electrode active material as an opposite electrode to the positive electrode for lithium ion batteries may include low crystallizable carbons (amorphous carbon) (e.g., easily graphitizable carbon, non-graphitizable carbon, and pyrolytic carbon); graphite (e.g., natural graphite and synthetic graphite); alloy-based materials containing tin, silicon, and the like; and oxides (e.g., silicon oxide, tin oxide, and lithium titanate). As the electrode active material as exemplified above, one type thereof may be solely used, and two or more types thereof may also be used in combination, depending on its use purpose.

The electrode active material for lithium ion battery electrodes is preferably in a granular form uniformly granulated well. When the shape of the particles is spherical, electrodes with higher density can be formed at the time of formation of electrodes.

The volume-average particle diameter (D50) of both the positive and negative electrode active materials for lithium ion battery electrodes is preferably 0.1 μm or more and 100 μm or less, more preferably 0.3 μm or more and 50 μm or less, and still more preferably 0.5 μm or more and 30 μm or less.

The binder contained in the granulated particles is preferably a compound capable of binding the electrode active materials to each other. The binder is more preferably a dispersive binder having a property of dispersing when in a solvent. Examples of the dispersible binder may include macromolecular compounds such as a silicone-based polymer, a fluorine atom-containing polymer, a conjugated diene-based polymer, an acrylate-based polymer, a polyimide, a polyamide, and a polyurethane, with a fluorine atom-containing polymer, a conjugated diene-based polymer, and an acrylate-based polymer being preferable, and a conjugated diene-based polymer and an acrylate-based polymer being more preferable.

The shape of the dispersive binder is not particularly limited, and is preferably particulate. The particulate dispersive binder has a favorable binding property and can reduce a drop in the capacity of the produced electrode and the deterioration of the produced electrode due to repetitive charging and discharging. Examples of the particulate binder may include an aqueous dispersion of binder particles such as latex, and a particulate binder obtained by drying such an aqueous dispersion.

The amount of the binder, based on dry weight, is usually 0.1 part by weight or more and 50 parts by weight or less, preferably 0.5 part by weight or more and 20 parts by weight or less, and more preferably 1 part by weight or more and 15 parts by weight or less, relative to 100 parts by weight of the electrode active material, from the viewpoint of sufficiently ensuring adhesion between the obtained electrode active material layer and the substrate and reducing the internal resistance.

The granulated particles may use a dispersant as described above, as necessary. Examples of the specific dispersant may include cellulosic polymers such as carboxymethylcellulose and methylcellulose, and ammonium or alkali metal salts thereof. As these dispersants, one type thereof may be solely used, and two or more types thereof may also be used in combination.

The granulated particles may use an electroconductive material as described above, as necessary. Examples of the specific electroconductive material may include electroconductive carbon blacks such as furnace black, acetylene black, and Ketjen black (registered trademark of Akzo Nobel Chemicals B.V.), with acetylene black and Ketjen black being preferable. Vapor-grown carbon fibers such as VGCF (registered trademark) and carbon nanotubes; graphite-based carbon materials such as expanded graphite and graphite; and graphene can also be used as the electroconductive material. As these electroconductive materials, one type thereof may be solely used, and two or more types thereof may also be used in combination.

The granulated particles are obtained by using an electrode active material, a binder, and other components such as an electroconductive material added as necessary, followed by granulating. The resulting granulated particles contain at least the electrode active material and the binder. Each of the electrode active material and the binder does not exist as an individual particle, but one particle is formed by two or more components including the electrode active material and the binder as constituent components. Specifically, it is preferable that a plurality of individual particles of two or more components are bonded to form secondary particles, and that a plurality of (preferably several to several tens of) electrode active materials are bonded with the binder to form particles.

The method for producing the granulated particles is not particularly limited. The granulated particles can be produced by any known granulation method such as a fluidized bed granulation method, a spray drying granulation method, and a tumbling bed granulation method.

The volume-average particle diameter (D50) of the granulated particles is usually 0.1 μm or more and 1000 μm or less, preferably 1 μm or more and 500 μm or less, and more preferably 30 μm or more and 250 μm or less, from the viewpoint of easily obtaining an electrode active material layer having the desired thickness.

The volume-average particle diameter (D50) of the granulated particles is a 50% volume-average particle diameter measured in a dry manner and calculated using a laser diffraction-based particle size distribution measurement device (e.g., Microtrac MT3300EX II; manufactured by MicrotracBEL Corp.). The 50% volume-average particle diameter is the particle diameter at a point where the cumulative frequency accumulated from the smaller diameter side on the obtained particle size distribution (volume basis) reaches 50%.

The feed amount of granulated particles from the feeding unit can be adjusted as appropriate depending on the size of the substrate and the desired weight per unit area.

<2.1.3. Step (B): Conveying Step>

The step (B) is a step of conveying the granulated particles that have been fed. In the third embodiment, usually, the granulated particles, together with the substrate, are conveyed by the substrate conveying unit serving as the conveying unit.

<2.1.4. Step (C): Granulated Particle Layer Forming Step>

The step (C) is a step of disposing the conveyed granulated particles on the support unit and leveling the granulated particles using the squeegee unit to form the granulated particle layer between the side surfaces of the pair of stock guide units. In the step (C), the granulated particles conveyed by the conveying unit are caused to pass through the gap between the support unit and the squeegee unit to level the granulated particles and form the granulated particle layer having a predetermined thickness. Also, in the aforementioned production apparatus, since the paired plate-like stock guide units are disposed to be parallel to the side surfaces of the squeegee, the granulated particle layer is formed between the side surfaces of the paired stock guide units.

The gap between the support unit and the squeegee unit and the distance between the side surfaces of the paired stock guide units can be appropriately selected depending on the thickness, the size, and the like of the desired electrode active material layer.

<2.1.5. Step (D): Rolling Step>

The step (D) is a step (D) of rolling the granulated particle layer using the rolling unit to form the electrode active material layer. As the rolling unit, for example, a pair of rolling rolls can be used. In the step (D), for example, by adjusting the distance between the paired rolling rolls, the pressure on the granulated particle layer can be adjusted.

In a case where the pair of rolling rolls is used as the rolling unit, the pressure for pressing the granulated particle layer can be adjusted by adjusting the distance between the respective rolling rolls. For example, by adjusting the difference between the gap portion between the support unit and the squeegee unit in the step (C) and the distance between the respective rolling rolls, the density of the electrode active material layer can be adjusted. Usually, the distance between the respective rolling rolls is adjusted to be smaller than the gap portion between the support unit and the squeegee unit. The specific distance can be appropriately adjusted depending on the thickness and density of the electrode active material layer.

The thickness of the electrode active material layer obtained in the step (D) is not limited to a particular one.

<2.1.6. Step (F): Binder Coating Liquid Coating Step>

The third embodiment may include a step of applying a binder coating liquid containing a binder onto the surface of the substrate as an optional step before the step (A). In this case, in the step (A) described above, the granulated particles are fed to the surface of the substrate onto which the binder coating liquid has been applied.

The binder contained in the binder coating liquid is preferably a compound that can bind powder containing an active material to the substrate. The binder coating liquid may contain additives such as a thickener and a surfactant to adjust the viscosity and wettability of the coating liquid. As the thickener and the surfactant, known ones can be used. Examples of the binder may include an SBR aqueous dispersion, an acrylate polymer aqueous dispersion, a polyacrylic acid (PAA) aqueous liquid, and a polyvinylidene fluoride (PVDF) organic solvent-based liquid. Also, as the binder coating liquid, for example, a dispersion or a solution containing the binder contained in the granulated particles can be used.

2.2. Production Method of Electrode Active Material Layer According to Fourth Embodiment The production method of an electrode active material layer according to the fourth embodiment includes the aforementioned steps (A) to (D), and further includes a step of feeding a substrate after the step (C). Herein, the step (D) includes rolling the granulated particle layer, which has been formed on the support unit, between the fed substrate and the support unit using the rolling unit to transfer the electrode active material layer onto the substrate.

The production method according to the fourth embodiment can be configured in a similar manner to the production method according to the third embodiment described above except a matter in which the steps (A) to (C) are performed on the support unit, a matter in which the step of feeding the substrate is further included after the step (C), and a matter in which the step (D) includes rolling the granulated particle layer, which has been formed on the support unit, between the substrate and the support unit using the rolling unit to transfer the electrode active material layer onto the substrate.

The production method according to the fourth embodiment may include a step of applying a binder coating liquid containing a binder onto the surface of the substrate as an optional step between the step of feeding the substrate and the step (D).

2.3. Modification

The production method of an electrode active material layer according to the present invention is not limited to the production methods according to the third and fourth embodiments. For example, the production method also include, for example, a production method (a production method according to a sixth embodiment) that uses a production apparatus (a production apparatus according to a fifth embodiment) illustrated in FIG. 9, that performs the steps (A) to (C) on a first substrate serving as a transferring material, that further includes a step of feeding a second substrate after the step (C), and that includes, in the step (D), rolling the granulated particle layer, which has been formed on the first substrate, between the first substrate and the second substrate using the rolling unit to transfer the electrode active material layer onto the second substrate.

<3. Electrode Active Material Layer>

The production apparatus of an electrode active material layer and the production method using the same according to the present invention can be used to produce electrode active material layers of various batteries. Among these, they are preferably used for producing electrode active material layers of lithium ion batteries. Furthermore, when the substrate for forming the electrode active material layer is an electroconductive substrate, the substrate and the electrode active material layer can be obtained as an electrode (electrode sheet).

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of mass, unless otherwise specified. The operation described below was performed under the conditions of room temperature (23° C.) and normal pressure (1 atm), unless otherwise specified.

Evaluation Method

<Evaluation for Strength of End Portion of Electrode>

In prepared electrodes, strength (cutting strength) of an electrode active material layer was evaluated by means of the SAICAS method. In the SAICAS method, cutting was performed from the surface of a sample (attached body) toward the adhesion interface with the substrate at a very low speed using a sharp cutting blade. At that time, the cutting strength was calculated from the width of the cutting blade and the horizontal force required to induce a state of continuously separating the attached body from the substrate and.

For measurement of the cutting strength, a SAICAS (surface and interface cutting analysis system), DN-GS, manufactured by Daipla Wintes Co., Ltd., was used, and the test conditions were as follows.

Cutting blade: Borazon (width: 500 μm)

Horizontal velocity: 2.0 μm/sec

Measurement depth: 10 μm

As for the positive electrode in Example 1, the center (4000 μm from the end portion) in the width direction, which is perpendicular to the longitudinal direction was set as a measurement point to perform the test.

In the measurement of the cutting strength, N=3 was set, and the evaluation results were expressed as indexes A, B, and C described below.

A: End portion strength: 0.25 N/mm or more

B: End portion strength: 0.15 N/mm or more and less than 0.25 N/mm

C: End portion strength: less than 0.15 N/mm

<Evaluation for Foil Wrinkle>

In the prepared electrode, the presence of wrinkles in the metal foil and the number of wrinkles were visually checked. The results were expressed as ranks described below.

A: The metal foil has no wrinkles (0 wrinkles).

B: The number of wrinkles generated in the metal foil is one or more and less than five.

C: The number of wrinkles generated in the metal foil is five or more.

<Evaluation for Smoothness at End Portion>

In the prepared electrode, the width of the electrode active material layer was measured, and the difference thereof from the desired forming width was calculated. Based on such a difference, smoothness at the end portion was evaluated using the following indexes. Usually, the smaller the difference, the better the smoothness at the end portions.

A: Desired forming width ±1.0 mm

B: Desired forming width over ±1.0 mm and 2.00 mm or less

C: Desired forming width over ±2.0 mm

<Evaluation for Yield>

The feed amount (weight) of the granulated particles and the weight of the positive electrode current collector were measured in advance. The weight of the prepared electrode was measured, and the weight of the positive electrode current collector was subtracted from the weight of the electrode to derive the weight of the electrode active material layer. Based on the difference between the feed amount of the granulated particles and the weight of the electrode active material layer, an yield was calculated using the following equation.

$$\text{Yield}(\%) = 100 - \{(\text{weight of granulated particles fed} - \text{weight of electrode active material layer}) / (\text{weight of granulated particles fed}) \times 100\}$$

The yield was evaluated using the following indexes.

A: Yield: 98% or more

B: Yield: 96% or more and less than 98%

C: Yield: less than 96%

<Friction Coefficient of Stock Guide Unit>

The static friction coefficient between the stock guide unit and the positive electrode current collector was measured in the following procedure.

The plate constituting the stock guide unit and the positive electrode current collector were each cut into a size of 80 mm×200 mm to obtain test pieces. The test pieces were overlaid on top of one another and were subjected to measurement in conformity to JIS K7125 (1999) using a friction tester ("TR-2" manufactured by Toyo Seiki Seisakusho, Ltd.) at a load of 200 g (moving distance: 100 mm, and speed: 500 mm/minute) to derive a friction coefficient.

Example 1

(Production of Granulated Particles)

As a positive electrode active material, $LiNi_{1/3}Co_{1/3}Mn_{1/3}O_2$ having an average particle diameter of 4.5 μm was prepared. As an electroconductive material, acetylene black (AB) was prepared. As a binder, an acrylic binder was prepared. As a thickener, carboxymethyl cellulose (CMC) was prepared. These materials were weighed so that the ratio by weight was satisfied the following, positive electrode active material:electroconductive material:binder:thickener=93.5:4:1.5:1.

Subsequently, the electroconductive material and the binder were put into a planetary disperser, mixed, were given an addition of the positive electrode active material and ion-exchange water serving as a solvent, and were evenly mixed, to prepare a conditioned liquid for forming granulated powder. By using a spray drier manufactured by Ohkawara Kakohki Co., Ltd., the conditioned liquid was then sprayed into droplets, and the solvent was removed and dried from the droplets, to obtain granulated particles having an average particle diameter of about 70 μm.

(Production of Positive Electrode Active Material Layer)

Next, the same acrylic binder as the binder used for the aforementioned granulated particles was dispersed into water to prepare a binder coating liquid. As for the characteristics of the binder coating liquid, the solid content concentration was 30% by mass, the viscosity was 6.7 mPa·s (25±2° C., 60 rpm), and the surface tension was 32 mN/m (Wilhelmy method). Also, as a positive electrode current collector, a long-length aluminum foil having a thickness of 15 μm and having a width of 250 mm was prepared and set in an electrode production line (production apparatus) illustrated in FIG. 1.

Belt-like current collector exposed portions were ensured at both widthwise end portions of the positive electrode current collector, and to form a binder coating liquid layer, the prepared binder coating liquid was applied between the current collector exposed portions (at the center region in the width direction) by a gravure coater (the coating unit 80 in FIG. 1) so that the coated amount was about 0.003 mg/cm$^2$.

Subsequently, the prepared granulated particles were fed by a powder feeding device (feeding unit) to the center region in the width direction of the positive electrode current collector to be conveyed so that the weight per unit area (per surface) became 28 mg/cm$^2$. Together with the positive electrode current collector, the granulated particles fed onto the positive electrode current collector were conveyed to a rolling roll (the support unit 30 in FIG. 1) provided downstream. By means of a roller squeegee (the squeegee unit 40 in FIG. 1), fluctuations of the weight per unit area were resolved and the vertical height in the width range of the positive electrode current collector was leveled. As a result, the granulated particles were made to have a substantially uniform thickness.

At that time, by providing a stock guide unit (the stock guide unit 50 in FIG. 1) on both the side surfaces of the roller squeegee, the granulated particles were prevented from flowing in the width direction of the current collector. As for the stock guide unit, a radius R (radius of curvature R0) of the rolling roll serving as a support unit and the radius of curvature R1 of the bottom surface of the stock guide unit were the same as each other, the ratio of the contact length of the stock guide unit with the current collector on the rolling roll relative to the circumference length of the rolling roll was 13.58, the gap between the stock guide unit and the current collector on the rolling roll was 0 mm, and the material for the stock guide unit was polytetrafluoroethylene (PTFE).

The radius R of the rolling roll in the production apparatus was 125 mm, and the radius of the squeegee unit was 50 mm. The squeegee unit and the stock guide unit were disposed so that the upstream end portion of the stock guide unit was located upstream of the upstream end portion of the squeegee unit and so that the downstream end portion of the stock guide unit was located downstream of the downstream end portion of the squeegee unit.

Subsequently, at the rolling rolls (rolling unit 60 in FIG. 1) disposed further downstream, the granulated particle layer was subjected to be rolled with rolls to form a positive electrode active material layer having a thickness of about 115 μm as an electrode active material layer. Note that the conditions for the pressing were as follows.

Distance between rolling rolls: 100 μm

Linear pressure: 1 t/cm

Rolling temperature: 50° C.

Examples 2 to 4

A positive active material layer was formed and evaluated as described above by the same manner as that of Example 1 except that a stock guide unit with the contact length relative to the circumference of the rolling roll as a support unit being 10.3% (Example 2), 7.5% (Example 3), or 17.5% (Example 4) was used as the stock guide unit.

Example 5

A positive electrode active material layer was formed and evaluated as described above by the same manner as that of Example 1 except that the positive electrode current collector on the rolling roll, which serves as a support unit, and the stock guide unit were not brought into close contact with each other, and a gap was formed between the stock guide unit and the positive electrode current collector. The size of the gap was 50 μm. This size is a distance equivalent to 71% of the average particle diameter ($D_{50}$) (70 μm) of the granulated particles.

Example 6

A positive electrode active material layer was formed and evaluated as described above by the same manner as that of Example 1 except that an ABS resin was used as the material for the stock guide unit so that the friction coefficient of the stock guide unit was 0.38.

Example 7

A positive electrode active material layer was formed and evaluated as described above by the same manner as that of Example 1 except that a polycarbonate was used as the material for the stock guide unit so that the friction coefficient of the stock guide unit was 0.50.

Comparative Example 1

A positive electrode active material layer was formed and evaluated as described above by the same manner as that of Example 1 except that a stock guide unit was not disposed.

Comparative Example 2

A positive electrode active material layer was formed and evaluated as described above by the same manner as that of Example 1 except that a stock guide unit in which the upstream end portion of the stock guide unit was located upstream of the upstream end portion of the squeegee unit and the downstream end portion of the stock guide unit is not located downstream of the gap portion was used.

Comparative Example 3

A positive electrode active material layer was formed and evaluated as described above by the same manner as that of Example 1 except that the rotating bodies described in Patent Literature 1 were disposed instead of the stock guide unit. In Comparative Example 3, the paired rotating bodies each having a rotation axis at the center of the circular plate were disposed so that the respective rotating axes were parallel to each other and so that the shortest distance between the respective side surfaces of the paired rotating bodies was a set width. By rotating the paired rotating bodies and causing the powder fed to the surface of the substrate to pass between the paired rotating bodies, the powder fed outside of the set width on the surface of the substrate was moved to fall within the set width on the surface of the substrate, and the weight per unit area of the granulated particles on the surface of the substrate was controlled by the squeegee member disposed between the paired rotating bodies.

The results are shown in Table 1 and Table 2. In Table 1 and Table 2, "contact length" indicates a ratio of the length of the contact portion between the stock guide unit and the positive electrode current collector on the rolling roll relative to the circumference length of the rolling roll serving as the support unit. Also, "gap from support unit" indicates a value expressed as a ratio of the size of the gap between the positive electrode current collector on the rolling roll serving as the support unit and the stock guide unit relative to the volume-average particle diameter (D50) of the granulated particles.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| stock guide unit | with/without shape | with plate-like | with plate-like | with plate-like | with plate-like | with plate-like | with plate-like | with plate-like |
| | contact length | 13.5 | 10.3 | 7.5 | 17.5 | 13.5 | 13.5 | 13.5 |
| | gap from support unit | 0 | 0 | 0 | 0 | 71 | 0 | 0 |
| | friction coefficient | 0.07 | 0.07 | 0.07 | 0.07 | 0.07 | 0.38 | 0.50 |
| effect | foil wrinkle | A | A | A | B | A | B | B |
| | smoothness at end portion | A | A | B | B | B | A | A |
| | yield | A | B | B | A | B | A | B |
| | strength of end portion | A | A | B | B | B | A | A |

TABLE 2

| | | Comp. Ex. 1 | Comp. Ex. 2 | Comp. Ex. 3 |
|---|---|---|---|---|
| stock guide unit | with/without | without | with | with |
| | shape | — | plate-like | rotating body |
| | contact length | — | 7 | — |
| | gap from support unit | — | 0 | — |
| | friction coefficient | — | 0.07 | — |
| effect | foil wrinkle | — | A | A |
| | smoothness at end portion | C | C | B |
| | yield | C | C | C |
| | strength of end portion | C | C | C |

In Examples 1 to 7, the upstream end portion of the stock guide unit is located upstream of the gap portion between the support unit and the squeegee unit, and the downstream end portion of the stock guide unit is located downstream of the gap portion between the support unit and the squeegee unit. In Examples 1 to 7 configured as described above, it was confirmed that the end portion smoothness of the resulting positive electrode active material layer was made favorable and that the end portion strength was also made favorable. In Examples 1 to 7, improvement in the yield, as compared with the case of not having the stock guide unit as described in Comparative Example 1, was also confirmed. On the other hand, as described in Comparative Example 2, in a case where the downstream end portion of the stock guide unit was not disposed downstream of the gap portion, the end portion smoothness was insufficient, and the yield was also low. As described in Comparative Example 3, in a case where the pair of rotating bodies was used instead of the pair of plate-like stock guide units, it was confirmed that the end portion strength was insufficient whereas the end portion smoothness was favorable. It was also confirmed that the yield was low.

REFERENCE SIGN LIST

1 substrate
2 granulated particles
3 granulated particle layer
4 electrode active material layer
5 electrode
**100*a*, 100*b*, 200, 300** production apparatus of electrode active material layer (production apparatus)
10 feeding unit
20 conveying unit
21, 91 substrate feeding unit
22, 92 substrate conveying unit
30 support unit
40 squeegee unit
40S side surface of squeegee unit
41 upstream end portion of squeegee unit
42 downstream end portion of squeegee unit
50 pair of plate-like stock guide units
60 rolling unit
70 collecting unit
80 coating unit
$t_1$ gap portion

The invention claimed is:

1. A production apparatus of an electrode active material layer, comprising:

a feeding unit that feeds granulated particles containing an electrode active material and a binder;

a conveying unit that conveys the granulated particles that have been fed from the feeding unit;

a support unit that supports the granulated particles that have been conveyed by the conveying unit;

a squeegee unit that is disposed spaced above the support unit and that levels the granulated particles to form a granulated particle layer;

a rolling unit that rolls the granulated particle layer to form an electrode active material layer; and a pair of stock guide units each having a plate shape; wherein:

the paired stock guide units each independently are disposed with the plate shape parallel to and facing side surfaces of the squeegee unit; and the paired stock guide units are disposed so that an upstream end portion of the stock guide units is located with the granulated particles therebetween upstream of a position of a gap portion between the support unit and the squeegee unit so that a downstream end portion of the stock guide units is located with the granulated particle layer therebetween downstream of the position of the gap portion, and so that a distance between side surfaces of the paired stock guide units is equivalent to a width of the electrode active material layer.

2. The production apparatus of an electrode active material layer according to claim 1, wherein:

the support unit has a roll shape; the paired stock guide units are disposed on the support unit; the paired stock guide units each independently have a surface which is located on a side closer to the support unit and is a curved surface; and a ratio (R1/R0) of a radius of curvature R1 of the curved surface of the stock guide units relative to a radius of curvature R0 of a curved surface of the roll of the support unit is 0.95 or more and 1.10 or less.

3. The production apparatus of an electrode active material layer according to claim 2, wherein: the conveying unit is provided on the support unit; the conveying unit and the stock guide units are in contact with each other; and a ratio of a contact length of the stock guide unit to a circumference length of the support unit is 7.5% or more and 17.5% or less.

4. The production apparatus of an electrode active material layer according to claim 1, wherein: the conveying unit is provided on the support unit; a gap is formed between the conveying unit and the stock guide unit; and a size of the gap is 70% or less of an average particle diameter (D50) of the granulated particles.

5. The production apparatus of an electrode active material layer according to claim 1, wherein the paired stock guide units each independently have a friction coefficient of 0.50 or less.

6. A production method of an electrode active material layer using the production apparatus of an electrode active material layer according to claim 1, the production method comprising:

a step (A) of feeding the granulated particles from the feeding unit;

a step (B) of conveying the fed granulated particles by the conveying unit;

a step (C) of disposing on the support unit the conveyed granulated particles and leveling the granulated particles using the squeegee unit to form the granulated particle layer between the side surfaces of the pair of stock guide units; and a step (D) of rolling the granulated particle layer using the rolling unit to form the electrode active material layer.

7. The production method of an electrode active material layer according to claim 6, further comprising a step of feeding a substrate before the step (A), the steps (A) to (D) being performed on the substrate.

8. The production method of an electrode active material layer according to claim 7, further comprising:

applying a binder coating liquid containing a binder onto a surface of the substrate before the step (A); and feeding the granulated particles on the surface of the substrate to which the binder coating liquid has been applied, in the step (A).

9. The production method of an electrode active material layer according to claim 6, further comprising a step of feeding a substrate after the step (C), wherein the step (D) includes rolling the granulated particle layer, which has been formed on the support unit, between the fed substrate and the support unit using the rolling unit to transfer the electrode active material layer onto the substrate.

* * * * *